United States Patent [19]

Denker

[11] Patent Number: 5,161,925
[45] Date of Patent: Nov. 10, 1992

[54] APPARATUS FOR BRINGING A TOOL TO A WORKPIECE AND APPLYING AXIAL FORCE THERETO, IN PARTICULAR AS A TAPPING MACHINE

[76] Inventor: James M. Denker, 711 First Parish Rd., Scituate, Mass. 02066

[21] Appl. No.: 424,076

[22] Filed: Oct. 19, 1989

[51] Int. Cl.⁵ .............................................. B23G 1/18
[52] U.S. Cl. .................................... 408/130; 408/128;
408/6; 408/7; 408/16; 470/96; 74/110; 74/89.2
[58] Field of Search .................... 408/128, 8, 130, 5,
408/11, 10 A, 16, 7, 6, 129, 124, 126, 141;
74/110, 89.2, 89.21, 89.22; 10/129 P, 136 E;
92/60, 64, 67, 98 D; 364/474.16, 474.12, 474.19;
318/626; 279/1 H

[56] References Cited

U.S. PATENT DOCUMENTS

| 56,354 | 7/1866 | Brant | 74/89.2 |
|---|---|---|---|
| 3,838,934 | 10/1974 | Petroff | 408/130 X |
| 4,064,585 | 12/1977 | Loos | 408/7 X |
| 4,338,556 | 7/1982 | Hetzel | 10/129 R |
| 4,342,528 | 8/1982 | Nozu et al. | 408/11 X |
| 4,756,237 | 7/1988 | Shishkin et al. | 92/69 R |
| 4,838,148 | 6/1989 | Denker | 92/90 |
| 4,841,843 | 6/1989 | Shishkin et al. | 92/98 D |

Primary Examiner—Larry I. Schwartz
Assistant Examiner—Robert Schultz
Attorney, Agent, or Firm—Hale and Dorr

[57] ABSTRACT

A tool head for moving a tool to a workpiece and applying an axial force thereto includes a grooved tubular spindle mounted on a fixed shaft for relative axial and rotational movement. The spindle is rotated by a timing belt transmitting power from a driver timing pulley. The timing belt is fitted around the timing pulley and grooved spindle with a pair of 90° twists in the loaded and unloaded sections between the two pulleys. As power is applied to the timing pulley, the belt migrates toward the end of the pulley and the spindle closest to the unloaded section of the belt; and when a resistant torque is applied to the spindle the timing belt migrates to a stable position with respect to both the timing pulley and the grooved spindle and transmits torque and an axial force to the spindle.

23 Claims, 6 Drawing Sheets

APPARATUS FOR BRINGING A TOOL TO A WORKPIECE AND APPLYING AXIAL FORCE THERETO, IN PARTICULAR AS A TAPPING MACHINE

BACKGROUND OF THE INVENTION

This invention relates generally to machines that bring a tool rapidly to a workpiece and then apply axial force to the workpiece. Such tools include taps, buffers, sanders, drills, grinders, millers, honers, lathes and the like. More specifically, the invention relates to an apparatus for tapping holes creating a helical threadform of predetermined depth in high volume production operations. Specifically, the invention relates to a hole tapping apparatus having a small number of moving parts and a fluid controlled actuator and control system.

Known apparatus for tapping holes in high volume production operations are generally lacking in many respects. Both the speed of the apparatus and the means for controlling cutting conditions require improvement.

Tapping machines engage a tap, and feed it into the work. In ideal conditions of a perfectly fabricated and uniformly sharp tap, the leading cutting surfaces of the tap cut a helical thread in the workpiece. The thread exactly matches the pitch and size of the trailing cutting surfaces of the tap. Thus, the trailing edges smoothly travel along the helical threads already created by the leading surfaces. The helical thread cut by the leading surfaces is referred to as the "lead." However, the ideal condition rarely, if ever, exists. Taps are not cut perfectly, and do not wear uniformly. Consequently, the typical condition is that the leading surfaces of the tap will tend to cut a helical thread lead of a certain shape while the trailing edges tend to cut a thread form of a differing shape. If only minimal axial force is applied to the tap (e.g., enough to engage the cutting edge but no more), the tap will draw itself into the hole at a rate dictated by the lead that it itself generates based on the pitch of the tap. Such would occur in the case of a hand tapping operation.

Automatic and power tapping machines, however, usually have a heavy lead screw to feed the tap to and into the work. Consequently, the lead screw tends to feed the tap into the work at a given rate dictated by the pitch of the lead screw. The phenomenon of the tap tending to generate one lead pattern and the lead screw tending to generate a different pattern is referred to as "redundancy". In any case where redundancy exists, the error, (i.e. the difference between the ideal path that would be generated by an ideal tap driven by the lead screw and the path that the real tap would generate on its own) increases as the length of the thread increases.

If the difference between the ideal path and the actual path are large, the tap will bind in the hole being formed. Binding itself is a serious problem. However, in cases where the driving lead screw is not adapted to discontinue applying axial force, the tap or the threads being generated may be damaged or broken.

In order to avoid the redundancy problem, conventional tapping machines allow the tap to "float" axially along the direction that the tap travels. Other mechanisms to relieve the "redundancy" involve making the linkage between the lead screw and the tap sufficiently flexible to allow for both rotational and axial spring motion.

Another drawback of conventional tapping apparatus and other shaping tools in general relates to high speed production. It is desirable that the tool be: brought to the workpiece; driven in a forward motion into the workpiece to shape the workpiece; driven out of the workpiece and withdrawn to the rest position, all as quickly as possible.

Tapping machines generally employ the lead screw to bring the tap to the workpiece. Some lead screws cause the tap to revolve at a constant speed, the cutting speed, as the screw advances. This results in a wasteful compromise. On the one hand, it is desirable to bring the tap to the workpiece as quickly as possible. For a given lead screw pitch, this would require a high RPM. On the other hand, once introduced into the workpiece, the tap has a maximum cutting speed, above which it will break or jam. Thus, for cutting speed purposes, a lower speed is desirable. Some machines have a control mechanism which senses the proximity of the tap to the workpiece, and adjusts the rotational speed accordingly. Such control mechanisms are unduly expensive.

Further, most shaping machines in use incorporate in their drive train large and heavy inertial bodies, including the lead screw and gearing to gear the rotary action of the tool up or down from the rotational speed of the driving engine. Consequently, at the point of rotation reversal, a large force must be applied to overcome and reverse the forward momentum. These machines tend to wear out relatively quickly due to the forces and attendant wear generated upon reversal. They are also quite noisy and are prone to vibration. The problem is particularly acute with machines for driving small tools, which must run at very high RPM's. The speed is generally obtained using a rotary motor operating at a high revolutionary speed, which itself must be reversed as quickly as possible.

Tapping machines encounter the further complication that in order to remove the tap from the threaded hole, its rotation must be reversed.

An additional problem of known machines and tapping machines in particular is that they incorporate a large number of moving parts which increases the original cost and the likelihood of misalignment, misfitting, wear and need for maintenance.

Yet another drawback of the apparatus of the prior art is that they require a relatively complicated system of sensors and feedback elements in order to automatically advance to the workpiece, shape the workpiece, e.g. tap the hole, reverse direction and retract from the workpiece, etc. Tapping machines require a particularly complicated control system, due to the required rotation reversal and speed change. Control systems of prior art tapping machines are inadequate or particularly costly. Various and often different types of sensors are required to determine when the tool has contacted the workpiece; when the tool has shaped the piece as desired; and when the tool has cleared the workpiece upon retraction.

Prior art tapping machines also cannot easily reverse the sense (i.e. right-handedness or left-handedness) of the threaded hole they are tapping, due to the fact that they are typically driven directly by a rotary motor through a gear train. It is necessary to interpose a reversing gear set in order to provide threaded holes of both hands.

Additionally, prior art machines each have a characteristic stall torque, i.e., a torque applied at the tool which will seize-up the driving mechanism. If the stall torque of the driving mechanism is greater than the torque that will damage the tool, then the tool will frequently be damaged. It is desirable to be able to adjust the stall torque, depending upon the requirements of the tool.

Other problems with such machine tools of the prior art, including tapping machines are that they are energy inefficient and heat up at high cycling rates and dissipate power even during standby conditions. They typically require electrical power, rather than safe and commonly available shop air pressure. They are typically costly, both to manufacture and to maintain.

OBJECTS OF THE INVENTION

Thus, the several objects of the invention include to provide a metal shaping machine which has the following features: ability to rapidly advance the tool to contact the workpiece and rapidly retract the tool upon clearing the workpiece; an infinitely adjustable and precisely repeatable stall torque; ability to operate in right hand or left hand sense with simple adjustment; a control system which directly and repeatedly controls the working depth and senses tool position with no contacts and no moving parts; a spindle speed that is infinitely variable and easily adjusted; tool advance and reverse speeds that are independently adjustable; quiet in all operations, including rapid cycling; energy efficient with no heating even at cycling rates over two cycles per second; no power dissipation during standby conditions; capable of operating without electrical power and with air pressure only; capable of shaping a workpiece at any angle in a workpiece and working in any position; low vibration; low initial manufacturing costs and low maintenance costs; ability to tap a hole without redundancy in the drive system; ability to reverse directions (both rotary and axial) upon completion of tapping a hole with no inertial shock; and all of the foregoing in a tapping machine.

BRIEF DESCRIPTION OF THE INVENTION

In a preferred embodiment, the invention comprises a tool head for moving a tool rapidly to a workpiece and applying an axial force thereto, including a grooved tubular spindle mounted on a fixed shaft for relative axial and rotational movement, which spindle is rotated by a high strength, endless timing belt transmitting power from a driver timing pulley whose rotational axis is at 90° with respect to the longitudinal spindle axis and is offset a distance commensurate with the length of the timing belt. The timing belt is fitted around the timing pulley and grooved spindle with a pair of 90° twists in the loaded and unloaded sections between the two pulleys, such that: in operation, as power is applied to the timing pulley, the belt migrates toward the end of the pulley and the spindle closest to the unloaded section of the belt; and when a resistant torque is applied to the spindle, e.g. upon engagement of the tool and the workpiece, the timing belt migrates to a stable position with respect to both the timing pulley and the grooved spindle and transmits torque and an axial force to the spindle; and upon reversal of the direction of the power applied to the timing pulley, the timing belt applies torque to the spindle in a reverse direction and an axial force in the retracting direction; and upon release of the tool from the workpiece and removal of the torque from the spindle, the timing belt migrates to the end of the spindle and pulley adjacent to the unloaded section of the belt, thereby retracting the spindle and tool rapidly from the workpiece.

In an additional preferred embodiment of the invention, power is applied to the shaft that drives the timing pulley by an actuator including a housing having a pair of internal cavities, a flexible but essentially inextensible belt mounted so as to form advance and retracting open-ended loops within the cavities and a pair of seal/port assemblies closing the open-ends of the loops and providing for fluid flow into and out of the loops. Both ends of the inextensible belt are fixed and the belt is guided around a pulley attached to the input end of the timing pulley drive shaft. Fluid flow into the advance loop (and out of the retraction loop) moves the belt and causes the volume enclosed by, and thus the length of the periphery of, the loop to increase, drawing the inextensible belt around the input pulley thereby applying power to the timing pulley drive shaft. Fluid flow into the retraction loop (and out of the advance loop) moves the belt in the opposite direction applying power in the reverse rotational sense to the timing pulley drive shaft.

In an additional preferred embodiment of the claimed invention, the spindle shaft is hollow and is provided with a vent arranged so as to be exposed to atmospheric pressure when the spindle has descended a distance sufficient to tap a hole of the desired depth; each of the cavities in the actuator housing are provided with at least one port for sensing the extent of the respective advance and retraction loops and for generating signals for controlling the application of fluid into and out of the loops, thereby providing a control mechanism for automatically controlling the cutting operation of the tap.

Additional objectives and features the invention will be understood with reference to the accompanying figures and the following detailed description.

DETAILED DESCRIPTION OF THE PREFERRED EMBODIMENTS OF THE INVENTION

Figure 1:
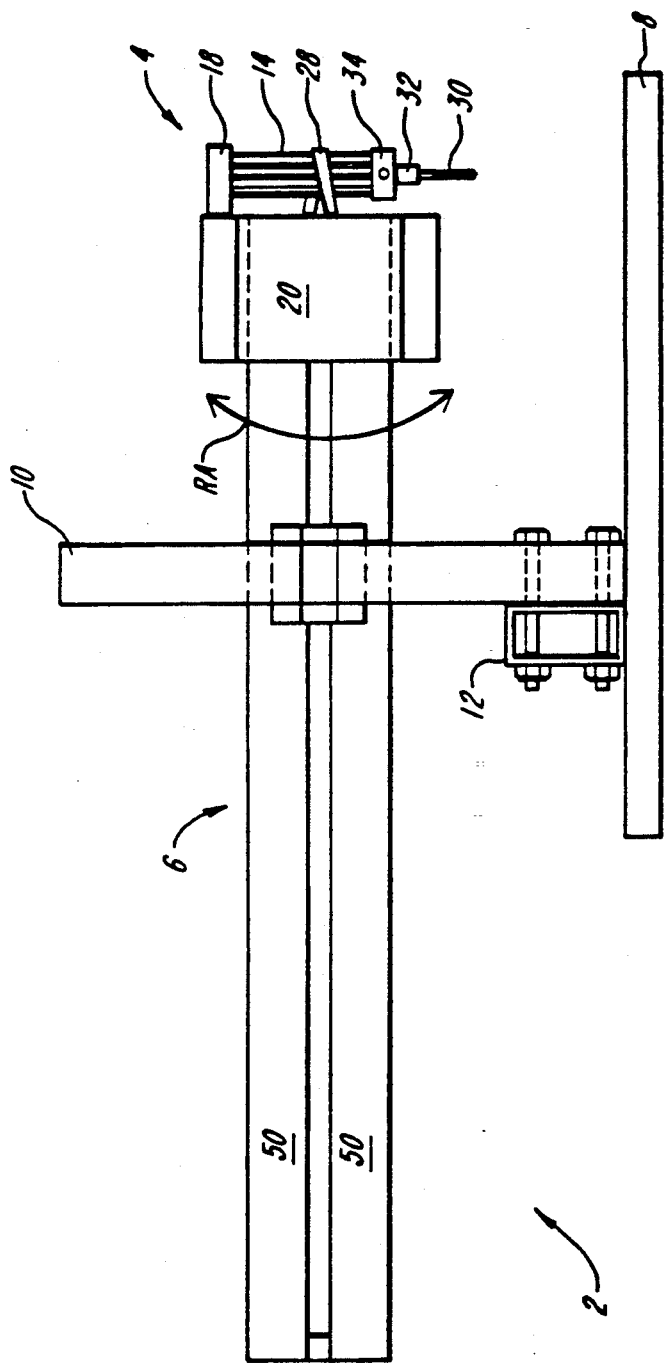
FIG. 1 is a side elevation view of a high speed tapping machine of the invention, including a head assembly, actuator assembly, base and support.

In a preferred embodiment of the claimed invention, as shown in FIG. 1, a high speed tapping machine 2 has a head assembly 4, an actuator assembly 6 a base 8 and a column support 10.

Figure 4:
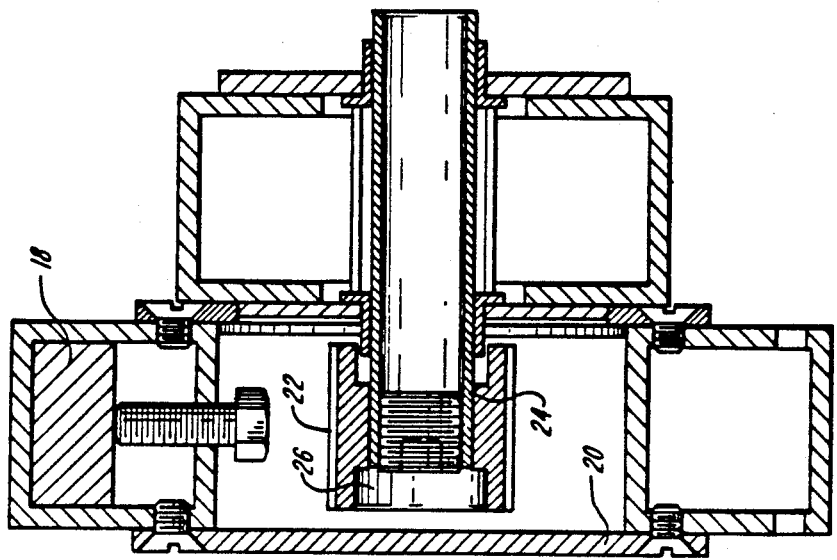
FIG. 4 is a front cross-sectional elevation view of the head assembly shown in FIG. 3 along the lines B—B.

The head assembly 4 includes generally a spindle 14 supported on a shaft 16 (shown in FIG. 3) which is itself supported from a bar mount 18. A housing 20 houses a driver timing pulley 22, shown best in FIGS. 3 and 4. As shown in FIG. 3, driver timing pulley 22 is mounted on the output end of drive shaft 24 by means of bolt 26. A high strength, endless timing belt 28 connects driver timing pulley 22 to grooved spindle 14.

Figure 2:
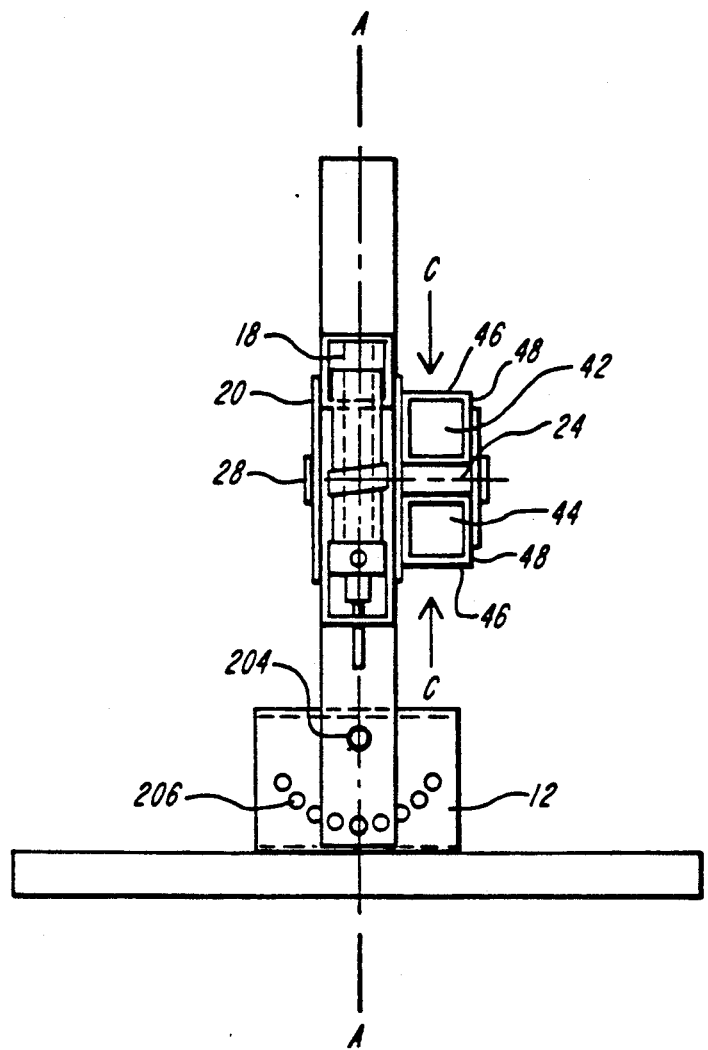
FIG. 2 is a front elevation view of the tapping machine of the invention shown in FIG. 1.

As can be seen from comparison of FIGS. 3 and 2, the axis of drive shaft 24 is perpendicular to the axis of spindle shaft 16 and is offset a distance appropriate to the length of the endless timing belt 28. Endless timing belt 28 is twisted twice 90°: once along the segment shown between points X and Y in FIG. 4 (counterclockwise as viewed in the direction from point X to point Y); and, once along the segment between points Z and Y, (counterclockwise as viewed in a direction from point Z to point Y. Grooved spindle 14 is free to rotate and translate axially upon shaft 16. It is retained upon shaft 16 due to the tension in belt 28, which, in a rest position, provides a slight force toward the bar mount 18 (upward as shown in FIG. 3).

Figure 3A:
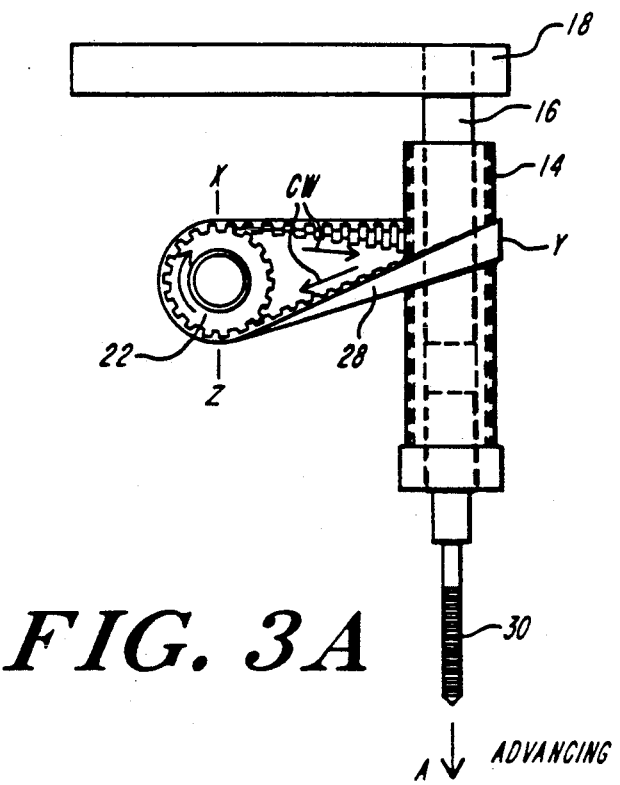
FIG. 3a is a schematic side elevation diagram showing the configuration of the endless belt for advancing a right-handed tap to a workpiece.
Figure 3B:
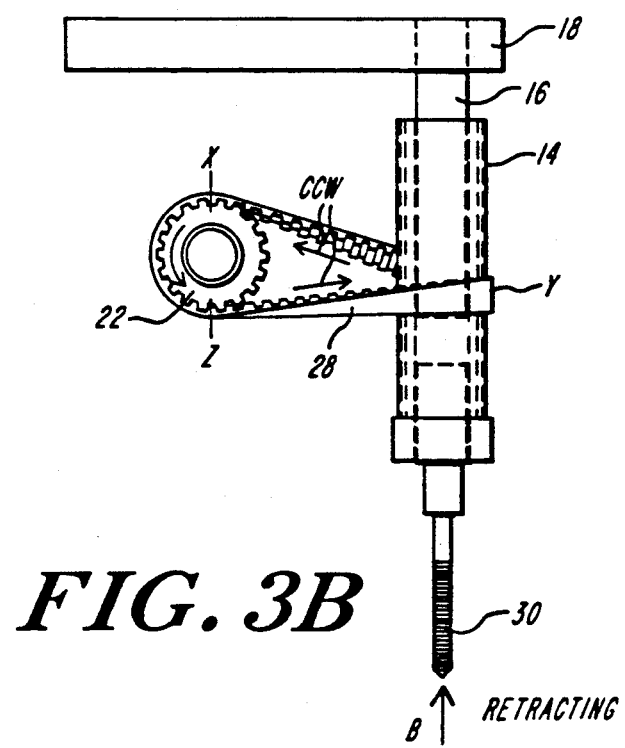
FIG. 3b is a schematic side elevation diagram showing the configuration of the endless belt for retracting a right-handed tap from a workpiece.
Figure 3:
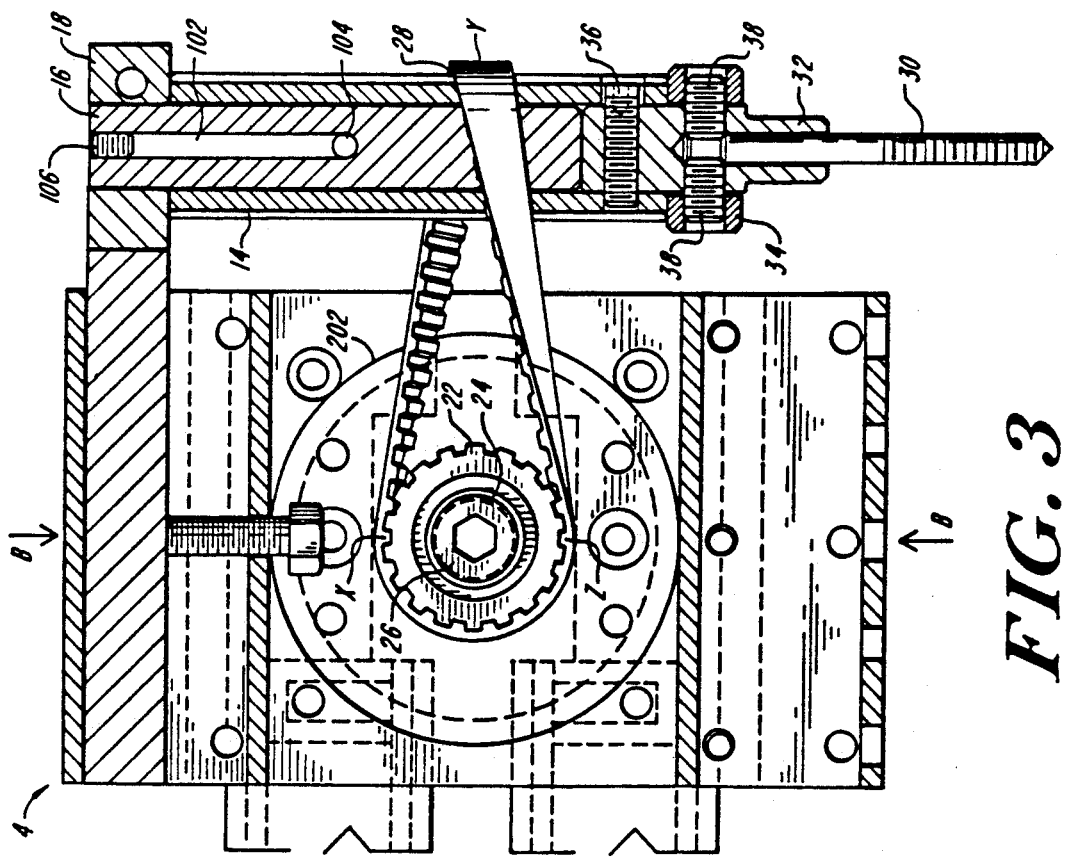
FIG. 3 is a cross-sectional side elevation view of the head assembly of the tapping machine shown in FIG. 2 along the lines A—A, with the endless belt shown in perspective.

As drive shaft 24 rotates, thereby rotating driver timing pulley 22 and thus belt 28 and spindle 14, a slight axial force is applied to spindle 14, as will be understood with reference to FIGS. 3A and 3B. As the driver pulley 22 rotates in a clockwise direction as shown in FIG. 3A, the loaded segment of the belt 28 is between the points Z and Y, which is on the side of the spindle 14 in the direction of the workpiece. Belt 28 travels along the direction of arrows CW, in a generally clockwise direction (as viewed from bar mount 18). As the belt 28 rotates, due to the twists in the loaded and unloaded portion of the belts, the belt migrates with respect to spindle 14 in a direction away from the loaded portion of the belt. Along spindle 14, as shown in FIG. 3A, it moves away from the workpiece, opposite the arrow A; along driver pulley 22, it moves into the plane of the paper. It will be noted that the angle between a tangent to the driver pulley 22 at point X and the belt leaving that point is significantly less than the angle between the tangent to the driver timing pulley 22 at point Z and the belt leaving at that point.

If there is no applied torque to resist the rotational motion of spindle 14, virtually no torque will be applied by the spindle to the timing belt 28, and the timing belt will freely migrate against the arrow A, away from the workpiece. Because the timing belt is constrained at one end by the translationally immovable pulley 22, the end engaging spindle 14 moves upwards slightly but reaches a point beyond which it can move no further. Because spindle 14, is free to translate axially with respect to shaft 16, and because a slight axial force exists between belt 28 and spindle 14, as the belt reaches the limit of travel, spindle 14 advances toward the workpiece in the direction of arrow A.

The motion of the spindle along arrow A is very rapid (emulating a very coarse screw) and depends solely upon the weight of spindle 14 and the axial force between belt 28 and spindle 14. The axial force depends principally upon the angle at which the belt 28 leaves the driving pulley 22, which depends upon the diameter of the driving pulley 22, the length of the endless belt 28 and to some extent the diameter of the spindler 14. The axial force is, however, largely independent of the rotational velocity of the drive pulley 22/timing belt 28/spindle system 14, when operating under no applied load.

For a timing pulley 22 of 1.146 inches pitch diameter, spindle 14 of 0.891 inches pitch diameter, located 2.38 inches apart, the spindle 16 will translate 1 inch in approximately 1–2 turns of drive timing pulley 22.

In order to retract the tap or other tool 30 from the workpiece, the driving timing pulley 22 is rotated in the opposite direction, counter clockwise as shown in FIG. 3B. Upon such rotation, the endless timing belt 28 also rotates in a counter clockwise direction (as viewed from bar mount 18), generally in accordance with the arrows CCW. Likewise, grooved spindle 14 rotates in a counter clockwise direction.

When, for instance, a tap has completed tapping a hole to the desired depth, the timing pulley 22 is reversed in direction. Consequently, the applied torque to the tap and spindle 14 reverses direction as does the axial force between the spindle 14 and the timing belt 28. Consequently, the timing belt 28 tends to migrate toward the end of the spindle 14 closest to the workpiece so that the angular relationship between the timing belt 28 and the tangents at point X and Z to the pulley 22 reverse. Again, because the timing belt is constrained in its motion parallel to the axis of shaft 16 and the grooved spindle 14 is not, grooved spindle 14 is retracted in a direction parallel to arrow R upon reversal of the rotation of driving timing pulley 22. Upon the tap's emergence from the tapped hole, and the removal of any applied torque to the tap, the speed of the spindle 14 in the direction R increases greatly (to approximately the same speed at which it advanced) and the spindle 14 is retracted entirely to its rest position.

It will be understood that during the period before engagement of the workpiece, the tap, or other tool, moves very rapidly to the workpiece. During this time, the angular relationship between the belt 28 and pulley 22 are shown in FIG. 3A. As torque is applied and the tap cuts the threaded hole, the belt migrates to a stable position and runs there until the applied torque changes. The angular relationship between the belt 28 and the timing pulley 22 at this phase of operation is shown in FIG. 3.

It will be understood that the advance and retraction of the system is automatic and absolutely determined by the geometry of the three drive components (timing pulley 22, timing belt 28 and grooved spindle 14).

The axial bias direction of the motion of the spindle 14 relative to the rotational direction of the driving pulley 22 may be reversed by simply engaging the timing belt 28 to the pulley 22 and spindle 14 with the 90° twists in the opposite direction. As such, the spindle 14 is then set up to rotate in the opposite direction during advancement along the arrow A and retraction along the direction of arrow R and is thus suitable for driving left handed tools, such as a left handed thread tap. No other adjustment is necessary, including no other adjustment to the drive to driving timing pulley 22.

Thus, the head assembly 4 of the invention accomplishes the objective of advancing a tool rapidly to and retracting the tool rapidly from a workpiece. No redundancy is encountered because the spindle 14 floats on the shaft 16 and thus, its axial advance is determined entirely by the lead established by the tap 30. The head assembly 4 of the invention accomplishes these objectives with only three moving parts (the timing pulley 22, the timing belt 28 and the spindle 14). The assembly may be easily reversed (both translationally and rotationally) upon completion of the work (e.g. for instance the tapping of a hole) due to the low inertia of the moving parts. The spindle 14 is hollow, the drive belt 28 is rather light and the pulley 22 need not be very large.

In the case of an embodiment of the invention constituting a high speed tapping machine, as shown in FIG. 3, a tap 30 is supported with respect to spindle 14 by means of tapholder 32 and collar 34. Tapholder 32 is anchored within the hollow central portion of spindle 14 by means of set screw 36, which passes through a threaded hole in tapholder 32 and anchors in a pocket across a diameter of spindle 14. Tap 30 is restrained with respect to tapholder 32 by means of a pair of tap set screws 38 which engage threaded holes in collar 34 and trap tap 30 between them. It will be understood that tap 30, collar 34 and the pair of set screws 38 float as a unit within the clearances provided in/around tap holder 32. This allows the tap to automatically adjust itself to cut a threaded hole when the pilot hole is not perfectly co-axial with the path of the spindle 14. This misalignment condition is common due to the practical tolerances involved.

Any suitable power source may be used in conjunction with the head assembly of the claimed invention. However, a particularly preferred embodiment utilizes a fluid driven actuator of a type generally described in U.S. Pat. No. 4,838,148 to Denker, "Actuator" issued Jun. 13, 1989, which is hereby incorporated by reference. A typical actuator 6 is shown with reference to FIG. 5.

Actuator 6 includes a housing 40 made up of retraction cavity 42 and advance cavity 44, which are generally arranged parallel to each other. This arrangement is not absolutely necessary, as will be understood with reference to the following discussion. Each of cavities 42 and 44 is of a rectangular cross section, made of flat side plates 46 and face plates 48. Face plates 50 (shown in FIG. 1) are not visible in FIG. 5 because the section treatment has removed them. Thus, plates 46, 48 and 50 define a cavity of a rectangular cross section. Flexible belt 52 is essentially inextensible. Each cavity includes a seal assembly 54 which seals cavities 42, 44 pneumatically from the atmosphere at that end. Flexible belt 52 is of a width so that it effectively provides an airtight seal between the portion of the cavities 42 and 44 facing the toothed face of the belt as opposed to the smooth face of the belt. A wiper seal 56 allows the belt 52 to exit from the chambers 42 and 44 without loss of pressure. The portion of the advance cavity 44 enclosed by the loop of belt 52 and seal assembly 54 is referred to as the high pressure advance zone and is designated 44b. The portion of the retraction cavity 42 enclosed by the loop of belt 52 and seal assembly 54 is referred to as the high pressure retraction zone and is designated 42b. The remaining portions of each cavity 42, 44 are designated as the low pressure retraction zone 42a and the low pressure advance zone 44a, respectively. The flexible belt 52 is anchored at ends at anchors 58. Any suitable form of anchoring the belts may be used, however, an airtight seal must be achieved.

Flexible belt 52 passes from within retraction cavity 42, past wiper seal 56 and around an input pulley 62, which engages the input end of drive shaft 24. It will be recalled that the output end of drive shaft 24 engages the driver timing pulley 22. Retraction cavity 42 is provided with a port 64 and advance cavity 44 is similarly provided with a port 66. Each port is adapted so that fluid, preferably air, may be introduced into the portion of the loop formed by inextensible belt 52 between anchor point 58 and wiper seal 56. As fluid, i.e. air, is introduced, for instance into high pressure retraction zone 42b, and as air is allowed to escape from inside high pressure advance zone 44b, the volume of zone 42b increases and the perimeter of the portion of the belt 53 forming the retraction loop that defines retraction zone 42b increases, while at the same time the volume of high pressure advance zone 44b and the perimeter of the portion of belt 52 forming the advance loop which defines that zone decrease.

Figure 5:
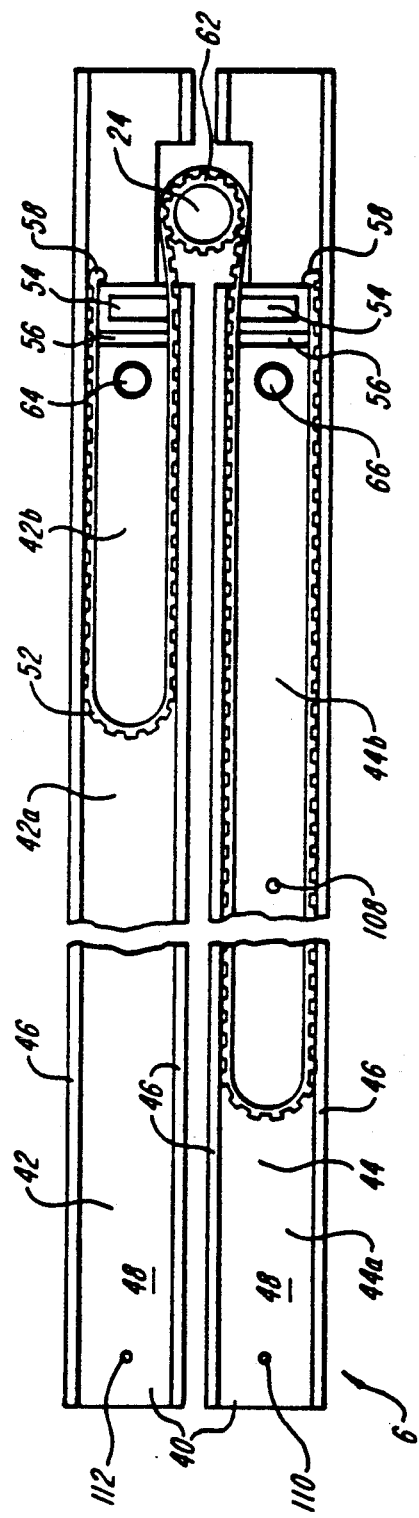
FIG. 5 is a not-to-scale side cross-sectional view of the actuator of the tapping apparatus shown in FIGS. 1 and 2, along the lines C—C of FIG. 2.

As the volume of the high pressure retraction zone 42b increases, for instance, input pulley 62 and shaft 24 will rotate in a counter clockwise direction, as shown in FIG. 5. With reference to FIG. 3, it will be seen that rotation in this direction causes driver timing pulley 22 also to rotate in the counter clockwise direction, which causes spindle 16 to rotate in a counter clockwise direction as seen from bar mount 18. The operation of the spindle 14 and tapping mechanism under these conditions have been discussed above, but to recapitulate, this would coincide with operation in the retracting direction.

As will be understood, this fluid driven actuator overcomes many of the drawbacks of the prior art. Most importantly, the actuator employs only a single additional moving part, i.e. essentially inextensible belt 52. Thus, the entire actuator/head assembly will drive taps with only four moving parts. Because the actuator does not use gears, it is not prone to vibration. Further, because the only moving parts are of relatively low inertia, the shock upon reversal of the direction of both rotation and axial movement is virtually nonexistent. The actuator 6 is preferably driven by safe, economical shop pressure and, depending upon the ultimate level of torque required for the particular size of tool piece, e.g. tap being used, either more or less pressure may be applied as desired. Thus, the pressure can be reduced to the lowest possible that will still achieve the cutting function, thereby reducing the stall torque when necessary to avoid damage to the tool and to the workpiece. Because the actuator 6 is air driven, it dissipates no power during standby conditions and dissipates very little heat even at high cycling rates, such as over two cycles per second.

The pneumatic actuator of the invention also facilitates an elegant and effective control system, suitable for accomplishing all of the objectives of a typical tapping machine or other similar device.

The control system is shown schematically in FIG. 6 and will be discussed with reference to FIGS. 6, 5 and 3. As has been discussed above, shaft 16 is provided with a hollow channel 102 which terminates in a spindle depth vent channel 104, which passes entirely through shaft 16 across a diameter. When spindle 14 advances toward the workpiece so that its uppermost extension passes beyond spindle depth vent 104, vent 104 (and thus all of channel 102) is exposed to the atmosphere and atmospheric pressure. This atmospheric pressure can be used as a control signal to indicate the extent of advance of grooved spindle 14. Hollow channel 102 is provided with a tapped hole 106 at its open end, adapted to receive a pressure fitting for communicating with other elements in the pressure control system.

The actuator 6 also includes elements of the control system. Turning to FIG. 5, advance cavity 44 is provided with two ports, which also are provided with threaded fittings (not shown) for transmitting a pneumatic signal to control elements the 50% advance travel port 108 and the advance limit port 110. Actuator retraction cavity 42 is similarly provided with a retraction limit port 112.

Figure 6:
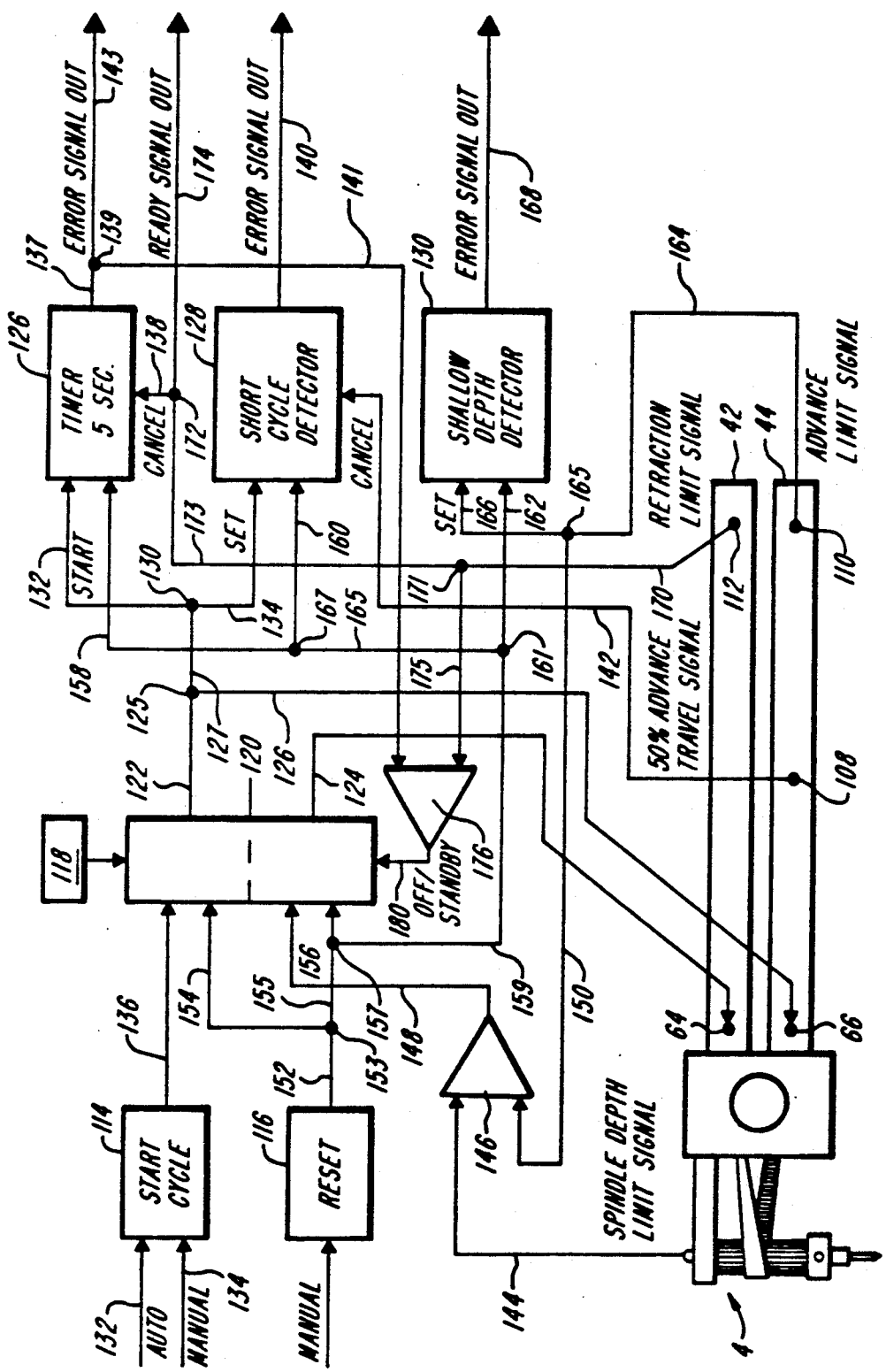
FIG. 6 is a schematic diagram showing the operation of a control system of the invention.

Other elements of the control system are shown in FIG. 6 and include a starting mechanism 114, a reset mechanism 116, a power supply 118, a diverting valve 120 for diverting air pressure through either advance line 122 or retraction line 124, a timer 126, a short cycle detector 128 and a shallow depth detector 130. Various pneumatic transmission lines and apparatus for combining pneumatic signals are also provided as discussed below.

The operation of the control system is as follows. A start signal is generated, either along the automatic line 132 or manual line 134 to starting mechanism 114. Manual line 134 is used during manual operation. Automatic line 132 is used in situations where the tapping machine is controlled by a numerical control device such as a digital computer. On receipt of the start signal, the starting mechanism 114 sends a signal along line 136 which causes diverter valve 120 to accept pressurized air from power supply input 118, and to transmit pressurized air at the required pressure along advance line 122 to T-junction 125 and along line 126 to actuator port 66 and high pressure advance zone 44b of advance cavity 44. This causes the high pressure advance zone 44b enclosed by the essentially inextensible actuator belt 52 to increase in volume, thereby drawing the belt into advance cavity 44 and rotating input pulley 62 and shaft 24 in a clockwise direction. As has been discussed above, this causes the essentially inextensible head assembly belt 28 to rotate in a clockwise direction and this causes spindle 14 to advance rapidly toward the workpiece in the direction of arrow A (FIG. 3A).

In normal operation, upon the start of the cycle the spindle 14 advances very rapidly until contact is made between the tool, e.g. a tap, and the workpiece. At the same time, the actuator belt 52 is being drawn into advance cavity 44, increasing the volume enclosed within high pressure advance zone 44b. For a reasonably dimensioned assembly of the following dimensions:

| | |
|---|---|
| ○ input pulley 62 | pitch diameter of 0.891 inches, 5 teeth per inch of circumference; |
| ○ belt 52 | 5 teeth per inch; |
| ○ driver timing pulley 22 | pitch diameter of 1.146 inches, 5 teeth per inch of circumference; |
| ○ grooved spindle 14 | pitch diameter of 0.891 inches, 5 teeth per inch of circumference. | under most conditions the spindle 14 will have gone through between 1 and 2 revolutions at most before the tap 30 contacts the workpiece.

It will be understood that the relationship between the number of rotations of the spindle 14 and the linear advance of the high pressure advance zone 44b enclosed within the advance loop of belt 52 is constant. It will also be understood that the number of threads of the hole being tapped similarly depends in a constant relationship upon the number of rotations the tap 30 experiences once it has contacted the pilot hole. Thus, once contact has been made with the pilot hole of the workpiece, the penetration of the tap into the threaded hole is directly related to the change in the extent of the high pressure advance zone 44b. It should be noted that in order to establish the maximum retention on a bolt, a tapped hole need be no more than 12 threads deep, and should generally between 6 and 12 threads.

The extent of travel of the spindle 14 with respect to the shaft 16 is also fixed. At the beginning of a cycle spindle 14 always butts up against bar mount 18. The length of channel 102 and the location of the spindle depth vent 104 remains constant. As will be discussed, the control system will always reverse the drive to spindle 14 when the spindle depth vent 104 is exposed to atmospheric pressure. Thus, the spindle 14 is constrained to travel no further than the spindle depth vent 104 will permit. Thus, the operator attempts to set up the machine so that the tap cuts between six and twelve threads before either the spindle depth vent 104 is exposed or the actuator belt 52 completely fills up advance cavity 44.

Thus, in normal operation, the spindle 14 begins its advance to the workpiece and contacts it within two rotations (of the spindle). The tap 30 begins cutting threads as it advances into the pilot hole, being rotated by belt 28, which is being driven by shaft 24, which itself is being driven by the motion of actuator belt 52 as high pressure advance zone 42a increases in volume. Eventually, the spindle will have rotated between six and twelve turns, and will have advanced so far that spindle depth vent 104 will have been exposed to atmospheric pressure. As discussed below, this will trigger a signal that will result in retraction of the spindle 14. At the same time, the high pressure advance zone 44b will have increased in volume to an extent so that it includes 50% advance travel port 108, but not so far that it includes advance limit port 110.

When spindle depth vent 104 is exposed to atmospheric pressure, a signal is transmitted along line 144 to reverse junction 146. Reverse junction 146 generates a reverse signal along line 148 if it has received a signal over line 144. A signal on line 148 is provided to advance/retraction valve 120, which, upon receiving a signal from line 148, switches to retraction operation and transmits high pressure fluid over retraction line 124. High pressure fluid transmitted through line 124 is introduced through retraction port 64 into high pressure retraction zone 42b enclosed by belt 52. At the same time, the pressure at port 66 within the high pressure advance zone 44b is reduced such that the high pressure in retraction zone 42b causes the belt 52 to be drawn into retraction cavity 42 and out of advance cavity 44, thus driving input pulley 62 and shaft 24 in a counter clockwise direction, which rotates spindle 14 in a counter clockwise direction (as viewed from bar mount 18) and thus unthreads tap 30 from the hole it has created and retracts the spindle away from the workpiece as described above.

The foregoing describes the ideal situation when everything is adjusted properly. However, in practical operation, many problems arise. Some of those problems include problems with the workpiece, such as misalignment so that the tap does not contact the pilot hole; placement of the workpiece on debris or other matter such that the workpiece is too close to the tap in its rest position; failure to place a workpiece in place; misorientation of the workpiece (i.e., upside down, reversed or rotated) or incorrect dimensions of the workpiece (i.e., too thick or too thin). Other problems related to the tap, e.g., the tap is broken, missing or dull. Finally, problems can arise if the head of the tapping machine is not located an appropriate distance from the ideal location of the workpiece. The control system of the invention is designed to detect those problems before they cause serious damage to the workpiece, the tapping machine or the tap. The control system is designed to maintain normal operation, and to detect trouble or error conditions and take appropriate action.

T-junction 125, which at the end of line 122 directs a pneumatic signal along line 127 to T-junction 130, which directs a signal along line 132 to timer 126 and another signal along line 134 to short cycle detector 128. Timer 126 is arranged to begin a timing cycle (assigned to 5 seconds for the purposes of this example) upon receipt of the signal from line 132. The time for the timer set should be slightly longer than the duration of an entire normal tapping cycle from start to return to the rest position. The timer 126 will send an error signal out through line 137 unless the timer 126 receives a cancel signal through line 138, as discussed below.

The short cycle detector 128 generates an error signal along line 140 until it receives a cancel error signal over line 142, as discussed below. If the error signal remains on line 140 at the end of a cycle the system will shut down.

The control system focuses on two inherent limits to the apparatus. The first limit is if the spindle depth vent 104 is exposed at the wrong time. In other words, the head assembly 4 runs out of shaft 16 before it has properly tapped the hole. The second limit is if the high pressure advance zone of actuator belt 52 completely fills advance chamber 44 before the spindle depth vent 104 is exposed. In other words, the actuator runs out of belt 52.

If the spindle advances far enough to expose spindle depth vent 104, but the tap 30 has not gone through enough rotations (and therefore not enough belt) to cut a suitably deep hole, the short cycle detector 128 signals an error.

Under normal operation, while the belt 52 expands into advance cavity 44, the spindle 14 advances towards the workpiece so that the tap 30 contacts the workpiece at the pilot hole. This translation occurs during approximately 1 to 2 revolutions of the spindle 14, and a corresponding lengthening of the perimeter of the advance loop of belt. As the belt 52 expands into advance cavity 44, it eventually extends beyond 50% advance travel port 108, such that the pressure at port 108 is equal to the high pressure inside the high pressure advance zone 44b. The high pressure is used to generate a signal signifying normal operation along line 142 to short cycle detector 128. Upon receipt of the signal along line 142, the short cycle detector stops sending the error signal along line 140. If the apparatus was properly set up initially, the spindle 14 will rotate a number of turns, dictated by the desired depth of the hole and the pitch of the cutting surfaces of the tap 30, which will also advance the spindle towards the workpiece, eventually exposing the spindle depth vent 104 to atmospheric pressure.

In some undesired circumstances, the spindle 16 will advance too far with respect to the location of spindle depth vent 104 before it contacts the workpiece. This might arise if the head is set too far from the workpiece, if the tap is missing, or if the workpiece is missing. In such a case, as has been discussed above, the spindle will have rotated at most two turns before contact is made between the tap and the workpiece; or, if the tap is missing, the tap holder 32 and the workpiece; or if the workpiece is missingm, the tap and the base 8. This is so even if the spindle 14 must travel a significant distance, because its axial travel is very rapid unless restrained by contact between tap and workpiece. Thus, the extent of high pressure advance zone 44b will have grown only slightly and the belt 52 will have advanced only a small amount. However, a significant extent of the axial travel of the spindle 14 permitted by spindle depth vent 104 will have been achieved. If there is no workpiece or no tap present, then the spindle depth vent 104 will have been exposed virtually within one or two turns of the spindle 14. The full extent of advance cavity 44 is sized to accommodate approximately 14 or 16 revolutions of spindle 14. Thus, by the time the spindle depth vent 104 is exposed and the reverse signal is generated as discussed above, the high pressure advance zone 44b enclosed within the loop of belt 52 will have extended less than half of the distance down advance cavity 44a.

Thus, 50% advance travel port 108 will not be exposed to the high pressure within zone 44b, and therefore no signal will be transmitted along line 142 to cancel the short cycle error signal generated upon start up by short cycle detector 128 over line 140. Before the next cycle can begin, the control system will detect the error signal on line 140. It will not begin a new cycle until the operator has checked the problem and cleared the error signal on line 140 by activating the reset mechanism 116. Activation of the reset mechanism 116 generates a signal along line 152, to T-junction 153, line 155, T-junction 157, line 159, T-junction 161, line 165, T-junction 167 and line 160 which resets, short cycle detector 128.

The foregoing operation of the control system (i.e., the maintenance of an error signal on line 140 throughout the entire cycle) will also arise if there is both tap and workpiece properly in place, but if the head 4 is located too far from the workpiece. In this instance, the tap 30 will contact the workpiece, but the spindle 14 will shortly travel so far that spindle depth vent 104 is exposed, thus triggering the retraction cycle described above. This will result in an error signal on line 140, which will alert the operator that, although a hole was tapped, it is probably not of the desired depth.

Thus, to properly place the head assembly, it must be positioned on support 10 so that the tap is at the desired depth when the top of spindle 14 is aligned with spindle depth vent 104. Provided that the number of threads produced is between 6 and 12 at the desired depth, drive reversal will occur upon the signal from spindle depth vent 104. This is the normal mode of operation and produces threads to a constant number and depth in each workpiece.

The second class of problems arises if the tap has rotated so many times that the belt 52 has extended fully into advance cavity 44, so that high pressure advance zone 44b encompasses advance limit port 110, while at the same time, spindle 14 has not advanced far enough to expose spindle depth vent 104. The actuator 6 has run out of belt 52. This condition would arise under two situations commonly encountered in automatic tapping operations. One is that there is no pilot hole in the workpiece. This is critical, because, as is well known, a tap does not drill its own hole, but must follow a pilot hole. The second situation is that the pilot hole is in the proper place, but the tap is too close to it. This arises if: the head 4 is set too low; or the wrong workpiece is put in place; or the workpiece is placed on the assembly line on top of something (such as another workpiece or a piece of scrap) which places the workpiece too close to the head of the tapping machine.

The control system of the invention detects either of these conditions because, provided that the tap 30 does not become jammed in the hole so tightly that rotation is halted, each results in an excessive number of revolutions of the spindle 14 and tap 30. If there is no pilot hole, the tap will contact the workpiece and simply spin, without advancing axially into the workpiece. In the case of the latter problem, if the tap does not run out of pilot hole, it will rotate until it runs out of actuator belt. In either case, the advance loop of the belt 52 extends all the way to the full extent of the advance cavity 44, exposing forward limit port 110 to the high pressure existing within the high pressure advance zone 44b. This high pressure generates a signal over line 164 which triggers a number of events. A signal is generated through T-junction 165 over line 150 to retraction junction 146, which generates a signal over line 148 to flip advance/retraction valve 120 to the retraction mode, which initiates retraction of the tap as described above. Additionally, a signal is generated over line 166, which triggers shallow depth detector 130 to generate an error signal over line 168. This indicates to the operator generally that the type of problem relates to the placement of the workpiece or its proper preparation for the tapping operations.

Other types of problems can arise which will slow down or halt the system, so that it takes longer than a normal period to complete a cycle. In such cases, the timer 126 comes into play. If the tap 30 becomes jammed in the workpiece and spindle rotation is prevented, timer 126 will not receive a cancelling signal on line 138 because the high pressure retraction loop 42b will not have grown to encompass retraction limit port 112 and thus will not have sent a signal along line 170 to timer 126. Thus timer 126 will send an error signal on line 137 to T-junction 139 over line 141 to summing junction 176 which sends a signal over line 180 to shut off diverter valve 120. An error signal is also generated on line 143 for other signalling purposes.

In some instances where the tap begins too close to the pilot hole, if the pilot hole is not deep enough, the tap will reach the bottom of the hole before the spindle depth vent 104 is exposed and while the actuator belt 52 continues to move. If the workpiece is very soft as compared to the tap, the threads in the hole mays strip. Otherwise the tap will jam, thus triggering the timer signal 126.

Thus, in light of the foregoing error signals, the operation of the control system in the absence of error is as follows. The cycle is started either due to a manual signal over line 134 or an automatic signal over line 132. The advance/retraction valve 120 is set to run forward and advance power is provided over advance line 122 to T-junction 125 and line 220 to advance port 66 in advance cavity 44. Simultaneously, timer 126 is started by virtue of signal arriving over line 132. As fluid flows into cavity 44 within the closed loop of belt 52 enclosing high pressure advance zone 44b, belt 52 is drawn into cavity 44 and the volume of high pressure advance zone 44b enclosed by the belt 52 increases. Shaft 24 is rotated in a clockwise direction due to the engagement of input pulley 62 by belt 52 as it travels around input pulley 62 and consequently shaft 24 rotates in a clockwise direction which causes belt 28 and spindle 14 to rotate in a clockwise direction as seen from bar mount 18. Tap 30 contacts the workpiece after spindle 14 has rotated between one and two rotations. By this time, the high pressure advance zone 44b enclosed within advance loop of belt 52 has not yet extended to the 50% forward travel port 108. The tap engages a pilot hole in a workpiece and proceeds to cut threads, being driven by the rotation of shaft 24, which rotates as the result of the increase in extent of high pressure advance zone 44b within the advance loop of belt 52. Within several additional turns, the advance of the high pressure advance zone 44b encompasses the location of 50% advance travel port 108 and generates a signal along line 142, which is received by short cycle detector 128 to cancel the error signal on line 140. Consequently, at the end of the cycle, there will be no error signal and the operator or the automatic control mechanism will not inhibit starting up of the next cycle.

As the pressure continues to expand the volume of high pressure advance zone 44b and thus the length of belt 52 which extends into advance cavity 44, the tap 30 will continue to rotate and advance into the workpiece. Eventually, the tap 30 and attached spindle 14 will advance so far that spindle depth vent 104 is exposed to atmospheric pressure which will transmit a signal over line 144 to retraction junction 146 which will generate a signal over line 148 to advance/retraction valve 120, switching the valve to deliver the high pressure to the retraction port 64 over line 124. Reversal of the mechanism as described above will cause the high pressure advance zone 44b enclosed by belt 52 to decrease as fluid leaves the chamber through port 66 and simultaneously the volume in high pressure retraction zone 42b enclosed by belt 52 in retraction cavity 42 will increase. Reversal will have arisen before the high pressure advance zone 44b grew to such a size as to encompass forward limit port 110, thus preventing the events described above upon providing high pressure at that port.

As the high pressure fluid continues to be introduced to high pressure retraction zone 42b, the extent of that zone increases until eventually the entire cavity is filled and retraction limit port 112 is exposed to high pressure. A signal is generated over line 170 which proceeds to T-connection 171, over line 173 to T-connection 172, and divides along one leg through line 138 to cancel the timer 126 error signal. The other line at T-connection 172, line 174, provides a ready signal to the operator or to the control system. It will be understood that in order for the error cancel signal along line 138 to be of practical effect, the timer 126 must be set for a period measurably greater than the normal advance and retraction cycle of the apparatus.

A portion of the signal along line 170 is also directed through T-junction 171 over line 175 to summing junction 176, which generates a signal over line 180 directing the advance/retraction valve 120 to shut itself off and stand by for the next signal.

If reset is desired at any time, the operator so indicates by triggering reset device 116. A signal sent over line 152 to T-junction 153 is transmitted over line 159 and over line 155 to T-junction 157 and line 156 to advance/retraction valve 120 to reverse it to the advance mode. A signal on line 159 divides at T-junction 161 to shallow depth detector 130 over line 162 and over line 165 to T-junction 167. From there it is transmitted over line 160 to short cycle detector 128 and over line 158 to timer 126, resetting both.

The head assembly, actuator and control system of the invention are particularly adaptable to the task of tapping threaded holes, as has been discussed above. Due to the unique drive mechanism, it is possible to tap a hole in practically any direction. As shown in FIGS. 1 and 2, head assembly 4 can be rotated 360° about axle 24 along arc RA. This rotatability is possible due to the fact that power is transmitted from driver timing pulley 22 through belt 28 to spindle 14 and there is no change in the geometric configuration with regard to the vertical orientation of the spindle 14. Reorientation of head 4 is achieved by release and rotation of plate 202 (FIG. 3), which secures the head assembly to the actuator housing 40.

The entire head, actuator and support assembly can be rotated about a lock point 204 of block 12 and the end of support 10 can be secured in any one of a number of anchor holes 206. This combined adjustability permits tapping holes in virtually any desired location and direction.

As will be evident to one of ordinary skill in the art, the head assembly of the invention is suitable for use with any automatic tool where a tool must advance rapidly to the workpiece, apply axial force to a workpiece and rapidly retract from the workpiece. It is particularly adapted for use with tapping machines where the sense (i.e., right handed or left handed) of the rotation of the tool must be reversed in order to retract the tool from its full stroke position within the workpiece. It will also be understood that the head assembly can be used with any sort of actuator and power supply, but is most suitably adapted for use with the pneumatically driven actuator/power supply and control system of the invention disclosed. The control system may be adapted by including additional sensing ports and activator valves, depending on the particular needs of the operation involved. Further, the control system need not be pneumatic, and can be electrical or mechanical, or a combination of any of the three.

The foregoing description should be taken as illustrative and not limiting in any sense. Other embodiments not described, but within the purview of the following claims are considered to be within the limits of the invention.

I claim:

1. An apparatus for bringing a tool to a workpiece and applying an axial force and torque thereto comprising:
   a. rotationally free means for receiving torque from a torque source;
   b. a pulley, fixed to said means for receiving torque so as to rotate therewith;
   c. a substantially flat cross-sectioned, substantially inextensible, endless belt engaged by a first loop with said pulley;
   d. a cylindrical shaft, fixed at one end relative to said rotational axis of said pulley, having an axis offset from and perpendicular to the rotational axis of said pulley;
   e. a hollow spindle, concentric with and free to rotate about and translate axially of said fixed cylindrical shaft and engaged by a second loop of said belt; and
   f. means for carrying a tool, fixed to said hollow spindle.

2. The apparatus of claim 1, wherein said pulley and spindle are grooved and said endless belt is toothed to mate with the grooves of said pulley and spindle.

3. The apparatus of claim 2, said shaft further comprising an axial hollow extending from said fixed end and terminating in a radial vent.

4. The apparatus of claim 1, said belt being twisted 90° along a first length of belt between said first and second loops and 90° along a second length of belt between said second and first loops.

5. An actuator for generating torque comprising:
   a. a housing having at least a first and second pair of parallel walls, said first pair of walls forming a first internal cavity and said second pair of walls forming a second internal cavity;
   b. a flexible, essentially inextensible belt mounted to form an open ended advance loop in said first cavity and an open ended retraction loop in said second cavity;
   c. in each cavity, a seal/port assembly closing the open end of the respective loop and providing for fluid flow into and out of said loop;
   d. means for fixing each of the ends of the belt relative to the housing; and
   e. a shaft having an input end and an output end; and
   f. a pulley, fixed to and free to rotate with said shaft, said pulley engaged by a third loop of said belt.

6. The actuator of claim 5, wherein each said cavity is of rectangular cross-section and extends along an axis, with said seal/port assembly thereof located at substantially one end of said axis.

7. The actuator of claim 6, said belt arranged so that, upon fluid flow into one of said advance and said retraction loops, the volume of the said one loop expands and results in an increase in the extension of the said one loop in the direction of said axis of the said cavity containing the said one loop, away from the seal/port assembly.

8. The actuator of claim 7, the first cavity further comprising a partial travel signal port located intermediate said axis, arranged to permit fluid communication between the volume enclosed by the advance loop and spaces outside of the cavity.

9. The actuator of claim 8, the first cavity further comprising a full travel signal port located adjacent the end of the cavity most distant from the seal/port assembly, arranged so as to permit fluid communication between the volume enclosed by the advance loop and spaces outside of the cavity.

10. The actuator of claim 9, the second cavity further comprising a full travel signal port located adjacent the end of the cavity most distant from the seal/port assembly, arranged so as to permit fluid communication between the volume enclosed by the retraction loop and spaces outside of the cavity.

11. An apparatus for bringing a tool to a workpiece and applying an axial force and torque thereto comprising:
   a. a rotationally free power shaft having an input end and an output end;
   b. a head assembly having:
      i. a pulley, fixed to said shaft so as to rotate therewith;
      ii. a substantially flat cross-sectioned, substantially inextensible, endless belt engaged by a first loop with said pulley;
      iii. a cylindrical shaft, fixed at one end relative to said power shaft, having an axis offset from and aligned perpendicular to said power shaft;
      iv. a hollow spindle, concentric with and free to rotate about and translate axially of said fixed cylindrical shaft and engaged by a second loop of said belt; and
      v. means for carrying a tool, fixed to said hollow spindle; and
   c. an actuator having:
      i. a housing having at least a first and second pair of parallel walls said first pair of walls forming a first internal cavity and said second pair of walls forming a second internal cavity;

ii. a flexible, essentially inextensible belt mounted to form an open ended advance loop in said first cavity and an open ended retraction loop in said second cavity;

iii. in each cavity, a seal/port assembly closing the open end of the respective loop and providing for fluid flow into and out of said loop;

iv. means for fixing each of the ends of the belt; and v. a pulley, fixed to said input end of and free to rotate with said power shaft, said pulley engaged by a third loop of said belt.

12. An apparatus for controlling the cycle of a thread tapping machine comprising:

a. timer means for determining if the end of a tapping cycle has occurred within a selectively specified period of time;

b. means for determined if at the end of a tapping cycle, a tap has advanced a specified distance in an axial direction and means for generating an error signal if said tap has not advanced said specified distance;

c. means for determining if at the end of a tapping cycle, said tap has completed at least a minimum number of rotations, and means for generating an error signal if said tap has not completed said minimum number of rotations when said tap has advanced said specified distance; and d. means for determining if at the end of a tapping cycle said tap has completed more than a maximum number of rotations before said tap has advanced said specified distance and means for generating an error signal if said tap has completed more than a maximum number of rotations before said tap has advanced said specified distance.

13. An apparatus for controlling tapping a hole in a workpiece comprising:

a. a rotationally free power shaft having an input end and an output end;

b. a head assembly having:

i. a pulley, fixed to said shaft so as to rotate therewith;

ii. a substantially flat cross-sectioned, substantially inextensible, endless belt engaged by a first loop with said pulley;

iii. a cylindrical shaft, fixed at one end relative to said power shaft, having an axis offset from and aligned perpendicular to said power shaft and an axial hollow extending from said fixed end and terminating in a radial vent;

iv. a hollow spindle, concentric with and free to rotate about and translate axially of said fixed cylindrical shaft and engaged by a second loop of said belt;

v. means for carrying a tap, fixed to said hollow spindle;

c. an actuator having:

i. a housing having a first and second internal substantially elongated cylindrical cavities of rectangular cross-section;

ii. a flexible, essentially inextensible belt mounted to form an open ended advance loop in said first cavity and an open ended retraction loop in said second cavity;

iii. in each cavity, a seal/port assembly closing the open end of the respective loop at a first end of the long axis of the cavity and providing for fluid flow into and out of said loop;

iv. means for fixing each of the ends of the belt; and v. a pulley, fixed to said input end of and free to rotate with said power shaft, said pulley engaged by a third loop of said belt; and d. a timer for determining if the end of a tapping cycle has occurred within a selectively specified period of time.

14. The apparatus of claim 13, further comprising means for generating an error signal if said tap fails to contact said workpiece during a tapping cycle.

15. The apparatus of claim 13, further comprising means for generating an error signal if said head assembly is set too close to said workpiece during a tapping cycle.

16. The apparatus of claim 13, further comprising means for generating an error signal if said workpiece is misoriented with respect to the tap during a tapping cycle.

17. The apparatus of claim 13, further comprising means for generating an error signal if said tap does not contact a pilot hole in said workpiece during a tapping cycle.

18. The apparatus of claim 14, said means for generating an error signal if said tap fails to contact said workpiece during a tapping cycle comprising:

a. means for determining if the spindle has translated with respect to the fixed shaft so much so as to expose said radial vent to ambient atmosphere; and b. in said first cavity, means for generating a partial travel signal if the advance loop has extended beyond a partial travel site intermediate said long axis.

19. The apparatus of claim 18, said means for generating a partial travel signal comprising:

a. a partial travel signal port located at said partial travel site, arranged to permit fluid communication between the inside of the cavity and the outside of the cavity; and b. means for determining if a portion of the belt forming the loop is located between said signal port and the end of the cavity most distant from the seal/port assembly.

20. The apparatus of claim 16, said means for generating an error signal if said workpiece is misoriented with respect to the tap comprising in said first cavity, means for generating a full travel signal if the advance loop has extended beyond a full travel site located adjacent the end of the cavity most distant from the seal/port assembly.

21. The apparatus of claim 20, said means for generating a full travel signal comprising:

a. a full travel signal port located at said full travel site, arranged to permit fluid communication between the inside of the cavity and the outside of the cavity; and b. means for determining if a portion of the belt forming the loop is located between said full travel signal port and the end of the cavity most distant from the seal/port assembly.

22. The apparatus of claim 15, said means for generating an error signal if said head is set too close to said workpiece comprising in said first cavity, means for generating a full travel signal in the advance loop has extended beyond a full travel site adjacent the end of the cavity most distant from the seal/port assembly.

23. The apparatus of claim 17, said means for generating an error signal if said top has not contact a pilot hole in said workpiece comprising in said first cavity, means for generating a full travel signal if the advance loop has extended beyond a full travel site adjacent the end of the cavity most distant from the seal/port assembly.

* * * * *